July 1, 1969  J. H. W. RATZER  3,452,694

CONTAINERS AND METHOD OF MAKING SAME

Filed Nov. 30, 1965

INVENTOR
JOHN HENRY WILLIAM RATZER
BY Howson and Howson
His ATTORNEYS

United States Patent Office 3,452,694
Patented July 1, 1969

3,452,694
CONTAINERS AND METHOD OF MAKING SAME
John Henry William Ratzer, Sharsted Court, near Setting-
bourne, England, assignor of one-half to Reads Limited,
Liverpool, England, a British company
Filed Nov. 30, 1965, Ser. No. 510,484
Claims priority, application Great Britain, Dec. 3, 1964,
49,113/64; Oct. 15, 1965, 43,762/65
Int. Cl. B21d 51/28, 51/34
U.S. Cl. 113—120                            9 Claims

ABSTRACT OF THE DISCLOSURE

This disclosure relates to a tongue and groove lap seam for use in the manufacture of can bodies.

---

This invention relates to containers having rigid or semi-rigid bodies and ends made from tinplate or other sheet metal. The bodies of such containers are usually formed from tinplate or other metal, but bodies of plastics or other materials are also envisaged by this invention. Such containers are frequently, and in this specification will be, referred to as "cans."

The seams of cans, either longitudinally along the body, where the latter is formed from a folded or rolled sheet, or joining the end of the body, are usually formed by some method involving folding over the meeting edges of the material so that they interlock. Forming such seams usually involves several operations, and uses a substantial amount of material. In the conventional "double seam" by which an end is usually secured to the body of a can, for example, both the body and the end are initially formed with outward flanges, that on the end being longer than that on the body. In forming the seam, the flange of the end is first folded around the edge of the flange of the body, and the composite flange so formed is folded flat against the wall of the body. These operations are usually performed by means of rollers against which the body and end flanges are rotated, or which rotate around the body and end flanges, the body and end being located on a chuck which fits in a countersink in the end which itself fits closely in the body. When the seam is completed it comprises five superimposed thicknesses of metal. Alternatively, in some instances, single seams are formed in a similar manner to that described, except that the can body is not flanged either before or during the seaming operation and the finished seam comprises four superimposed thicknesses of material.

According to this invention, in its broadest aspect, a seam is formed in a can by lapping the margins of material to be seamed over one another, forming a groove in one of the margins, parallel to and spaced from the edge thereof by the length of the overlap, and turning the edge of the other margin through at least a right angle to form a tongue of length, perpendicular to the edge, substantially equal to the depth of the groove, and engaging the tongue in the groove.

The groove may be formed before overlapping the margins, or alternatively may be formed by pressing the tongue against the material it overlaps.

The seam so formed resists separation in a direction perpendicular to the edges and along the overlap by virtue of the engagement of the tongue in the groove. Adhesive or solder may be required to hold the parts in overlapped relation in some instances but in other the rigidity of the material itself will be sufficient.

The invention also includes a can having a seam formed in the manner described.

Figure 1:
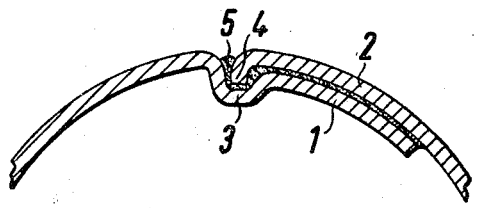
Figure 2:
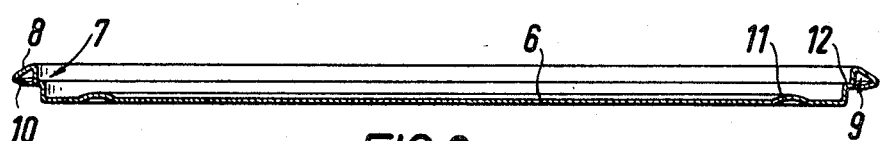
Figures 3, 4:
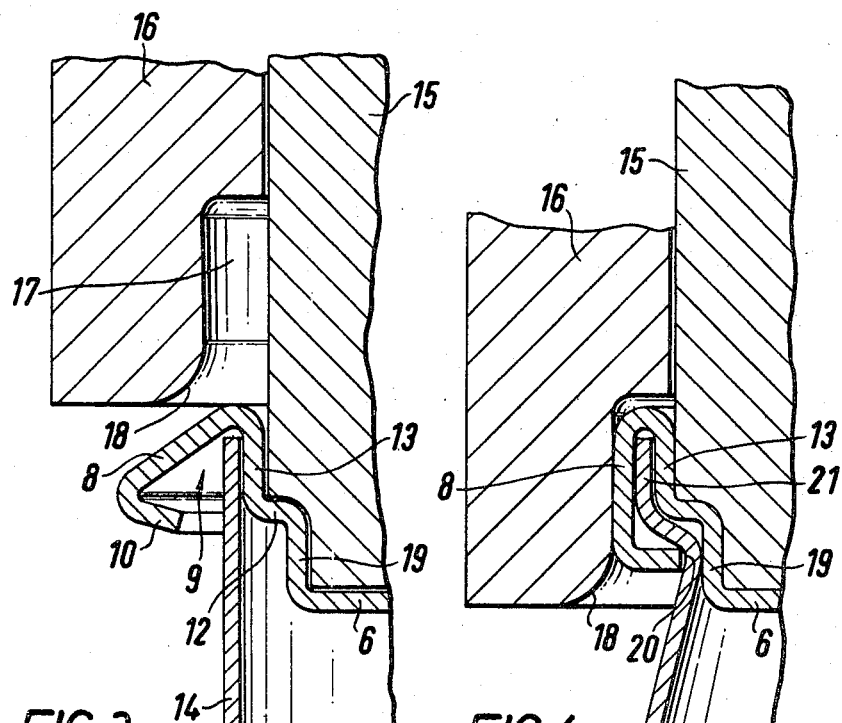

Embodiments of the invention are illustrated, by way of example, by the accompanying drawings, in which:

FIGURE 1 is a sectional end view of a longitudinal body seam in a circular cylindrical can, FIGURE 2 is a sectional elevation of a closure end for a can, FIGURE 3 is a fragmental sectional elevation, on an enlarged scale, showing the end of FIGURE 2 assembled with a can body, prior to the seaming operation, and FIGURE 4 is similar to FIGURE 3, showing the parts after completion of the seaming operation.

Referring first to FIGURE 1, a seam is formed between the margins 1 and 2 of a circular cylindrical can body, which are overlapped. Parallel to and spaced from the edge of the inner margin 1 by the desired length of overlap the material of the body is formed with a groove 3, and the inner margin 1 is offset inwardly from the circle of the remainder of the body material by a radial distance approximately equal to the thickness of the material so that the overlapping margin 2 will be flush with the remainder of the body, as shown. The edge of the overlapping margin 2 is turned inwardly substantially at right angles to the margin to form a tongue 4, which is engaged with the groove 3. The groove 3 is made of width slightly greater than the thickness of the material, and of depth slightly greater than the length of the tongue 4, so that the latter will fit snugly in the groove.

The margins are secured in overlapping relation by an adhesive 5, which may be a natural or synthetic resin or rubber compound, or may be metallic, such as a solder. The adhesive may be applied either to one or both margins before they are brought together, or to the assembled seam. The former method would be more suitable for a contact adhesive, whereas for a solder the latter method would be most convenient.

The seam so formed resists separation in a circumferential direction, such as might be caused by internal pressure in the can, by the engagement of the tongue 4 in the groove 3, and the resistance of the tongue to bending, and does not rely entirely on the adhesive for this resistance.

The tongue 4 is preferably of the shortest length, perpendicular to its edge, that can conveniently be produced so as to give the maximum resistance to bending.

A similar seam could be formed between a can body and end, for example by forming the body with a circumferential groove, and the body with a peripheral flange having a tongue to engage the groove.

Referring now to FIGURES 2, 3 and 4 which illustrate a preferred method of seaming a closure end to a can body, the end 6 is countersunk having a central part surrounded by an upstanding countersink wall 7, which is stepped, as will be described. From the edge of the countersink wall the metal of the end is turned downwardly and outwardly to form a surrounding inclined flange 8 of radial length somewhat less than the depth of the countersink wall, defining a V-shaped groove 9 with the outside of the countersink wall, and the peripheral edge of the flange 8 is turned inwardly so as to form a tongue 10 lying approximately at right angles to the major parts of the countersink wall 7, that is at an acute angle to the flange. The closure end has also a circular reinforcing rib 11. The tongue 10 is of the shortest length which can readily be formed, and the countersink wall 7 is formed with a step 12 at a distance from its upper edge somewhat less than the radial length of the flange, and of radial length approximately equal to the length of the tongue 10.

The upper part 13 of the countersink wall 7 is of outer diameter such as to fit closely within a can body 14 which is of circular cylindrical shape without any flange or other shaping at its edges. To assemble the closure end 6 with the body 14, the closure end is inserted into the open end of the body so that the edge of the latter enters the V-shaped groove 9 and fits closely against the upper part 13 of the countersink wall. A chunk 15, the end of which is shaped to fit closely within the stepped countersink wall and against the central part of the end 6 is fitted within the end so as to engage and support the countersink wall. The chuck 15 is slidable within an annular punch 16 against spring pressure, the annular punch having a circular recess 17 around the inner edge of its operative end, which is directed towards the assembled can body and closure end. The recess 17 is of radial width substantially equal to the total thickness of two layers of the material from which the end closure is formed and one layer of the can body material, and is of length somewhat greater than the radial length of the flange 8. The edge 18 of the punch is smoothly radiussed or could be otherwise profiled to provide a bell-mouth for the recess.

Having assembled the can body and closure end below the chunk as described and illustrated in FIGURE 3 the annular punch 16 is lowered so that its radiussed edge 18 defining the bell-mouth of the recess 17 engages the surface of the flange 8, applying a closing force, parallel to the axis of the body 14, around the whole periphery of the punch stroke progresses the flange is closed down towards the can body wall until the annular edge of tongue 10 engages the wall. From this position further movement of the punch causes the can body wall to be indented between the step 12 of the countersink wall and the edge of the tongue, until it meets and is forced against the lower, smaller diameter portion 19 of the countersink wall, as shown in FIGURE 4. The can body wall is thus formed as shown with a circumferential groove 20, having its upper side more steeply inclined than its lower side, in which the tongue 10 of the closure end is engaged. During the pressing operation with the tongue is bent in relation to the flange 8 so that it still lies approximately at right angles to the major part of the countersink wall. The punch and the chunk are then withdrawn, leaving the end closure 6 securely seamed to the can body 14 by the engagement of its tongue 10 with the circumferential groove 20 and by the gripping of the end 21 of the body wall beyond the groove 20 between the countersink wall and the inner wall of the flange 8 which now lies parallel to the axis of the can body. Longitudinal removal of the end closure is resisted by the resistance to bending of the tongue 10.

The seam produced as described and illustrated in FIGURE 4 may be sufficient for some purposes, but for others it may be sealed by running an adhesive or sealing compound into the groove 9 within the flange 7 before assembling or by soldering or adhesively securing the tongue 8 to the body wall.

Although the invention has been described in relation to FIGURES 2 to 4 with reference to the seaming of a closure end to a body it will be understood that ends which are not in themselves closures may be seamed to bodies by similar means. The end can be, for example, an annular part to be closed by a push-in flange closure or some other type of closure. Furthermore, although the invention has been described with reference to a can of circular cross-section, it will be understood that it is not in any way limited to such cans, and can be used for seaming cans of irregular cross-section.

In describing the drawings the words "upper," "lower," "downwardly" and the like have been used for convenience, but it will be understood that these are not in any way very limiting terms, and the end could be assembled with the can body in any desired position.

Since it is not necessary to flange the can body, and no folding of flanges one upon another is required there is not only a saving of material by use of the present seaming method in comparison to known methods, but there is a further saving in that only one operation is required for producing the seam. The number of preparatory operations on the can components is also reduced, and the closing operation by a simple sliding punch requires less complicated machinery than the more usual double seaming equipment.

We claim:
1. Method of forming a seam in the manufacture of a can comprising lapping the margins of material to be seamed over one another, forming a groove in one of the margins, parallel to and spaced from the edge thereof by the length of the overlap, and turning the edge of the other margin through at least a right angle to form a tongue of length, perpendicular to the edge, substantially equal to the depth of the groove, and engaging the tongue in the groove.

2. Method according to claim 1 wherein the groove and tongue are formed before overlapping the margins.

3. Method according to claim 1 wherein the tongue is formed before overlapping the margins and the groove is formed after overlapping by pressing the tongue against the material it overlaps.

4. Method according to claim 1 for seaming an end to a can body comprising forming the end with an inclined flange to provide the margin to be overlapped with the body of the can, turning the edge of the flange to form the said tongue, assembling the end with the body and applying closing force to the flange around its whole periphery in a direction parallel to the axis of the can so as to close it against the wall of the can body.

5. Method according to claim 4 comprising forming the end with a stepped chuck wall from which the flange extends, the flange being of length less than the depth of the chuck wall but greater than the depth from the edge of the chuck wall to its step, and the length of the tongue being approximately equal to the length of the step, the part of the chuck wall adjacent the flange being of dimension such as to fit closely within the end of the body whereby on closing the flange against the body the tongue forces the grooved part of the can body against the reduced part of the stepped chuck wall.

6. Method according to claim 1 including the step of applying an adhesive to a margin before they are overlapped.

7. Method according to claims 1 and 4 including the step of applying an adhesive such as a solder to the completed seam.

8. Method according to claim 1 including the step of applying a sealing compound, for example a solder, to the completed seam.

9. A can comprising overlapping margins forming a seam, a groove in one of the margins, parallel to and spaced from the edge of said margin by a length substantially equal to the overlap, and a tongue at the edge of and substantially perpendicular to the other margin, said tongue lying in said groove and having a length substantially equal to the depth of the groove.

References Cited
UNITED STATES PATENTS
3,223,063  12/1965  Payton _____ 113—121

RONALD D. GREFE, *Primary Examiner.*

U.S. Cl. X.R.

220—76

UNITED STATES PATENT OFFICE
CERTIFICATE OF CORRECTION

Patent No. 3,452,694                                           July 1, 1969

John Henry William Ratzer

It is certified that error appears in the above identified patent and that said Letters Patent are hereby corrected as shown below:

Column 1, line 29, "of the body" should read -- to the body --. Column 3, line 3, "chunk" should read -- chuck --; line 19, "chunk" should read -- chuck --; line 36, "with the tongue" should read -- the tongue --; line 38, "chunk" should read -- chuck --. Column 4, line 48, "Claim 1 and 4" should read -- Claim 1 or 4 --.

Signed and sealed this 17th day of February 1970.

(SEAL)
Attest:

EDWARD M. FLETCHER, JR.                      WILLIAM E. SCHUYLER, JR.
Attesting Officer                               Commissioner of Patents